United States Patent [19]

Leigh-Monstevens

[11] Patent Number: 4,941,323
[45] Date of Patent: Jul. 17, 1990

[54] HYDRAULIC CYLINDER PROVIDED WITH A SEAL-LESS PISTON

[75] Inventor: Keith V. Leigh-Monstevens, Troy, Mich.

[73] Assignee: Automotive Products plc, Warwickshire, England

[21] Appl. No.: 339,966

[22] Filed: Apr. 19, 1989

Related U.S. Application Data

[63] Continuation of Ser. No. 112,047, Oct. 2, 1987, abandoned, which is a continuation of Ser. No. 830,272, Feb. 18, 1986, abandoned.

[51] Int. Cl.$^5$ ............................................. B60T 11/236
[52] U.S. Cl. ........................................ 60/589; 92/168; 92/169.1; 92/170.1
[58] Field of Search ............... 60/585, 589, 588, 592, 60/533; 92/170, 168, 169.1

[56] References Cited

U.S. PATENT DOCUMENTS

| | | | |
|---|---|---|---|
| 2,242,096 | 5/1941 | Thomas | 60/589 |
| 3,156,097 | 11/1964 | Brown | 60/588 |
| 3,266,383 | 8/1966 | Cairns | 92/170 X |
| 3,312,149 | 4/1967 | Fleckenstein et al. | 92/170 X |
| 4,455,832 | 6/1984 | Gaiser | 60/589 |
| 4,474,005 | 10/1984 | Steer | 60/589 |
| 4,495,772 | 1/1985 | Furuta | 60/589 |
| 4,505,112 | 3/1985 | Nakamura | 60/533 |
| 4,514,982 | 5/1985 | Bach | 60/589 |
| 4,528,895 | 7/1985 | Nakamura | 60/589 |
| 4,557,110 | 12/1985 | Price | 60/589 |
| 4,631,924 | 12/1986 | Lowe | 60/589 X |
| 4,671,065 | 6/1987 | Ishiwata | 60/533 |

FOREIGN PATENT DOCUMENTS

| | | | |
|---|---|---|---|
| 2015870 | 10/1970 | Fed. Rep. of Germany | 60/585 |
| 2460344 | 6/1976 | Fed. Rep. of Germany | 60/585 |
| 3234291 | 3/1984 | Fed. Rep. of Germany | 60/589 |
| 865484 | 5/1940 | France | 60/588 |
| 626073 | 7/1949 | United Kingdom | 60/588 |
| 1120068 | 7/1968 | United Kingdom | 60/585 |

Primary Examiner—Robert E. Garrett
Assistant Examiner—George Kapsalas
Attorney, Agent, or Firm—Krass and Young

[57] ABSTRACT

A hydraulic cylinder having an internal groove in which is disposed a seal member peripherally engaging a seal-less reciprocable piston. In one form, the hydraulic cylinder is a master cylinder having a valved port in fluid communication with a source of fluid, opening and closing of the port being effected by a reciprocable plunger mounted on the end of the piston. An outlet port and a conduit places the chamber of the master cylinder in fluid communication with the chamber of the slave cylinder. In a slave cylinder version, a single port places the pressure chamber of the slave cylinder in communication with the master cylinder for introducing fluid and withdrawing fluid into and from the slave cylinder chamber, and thereby reciprocating the slave cylinder piston.

6 Claims, 3 Drawing Sheets

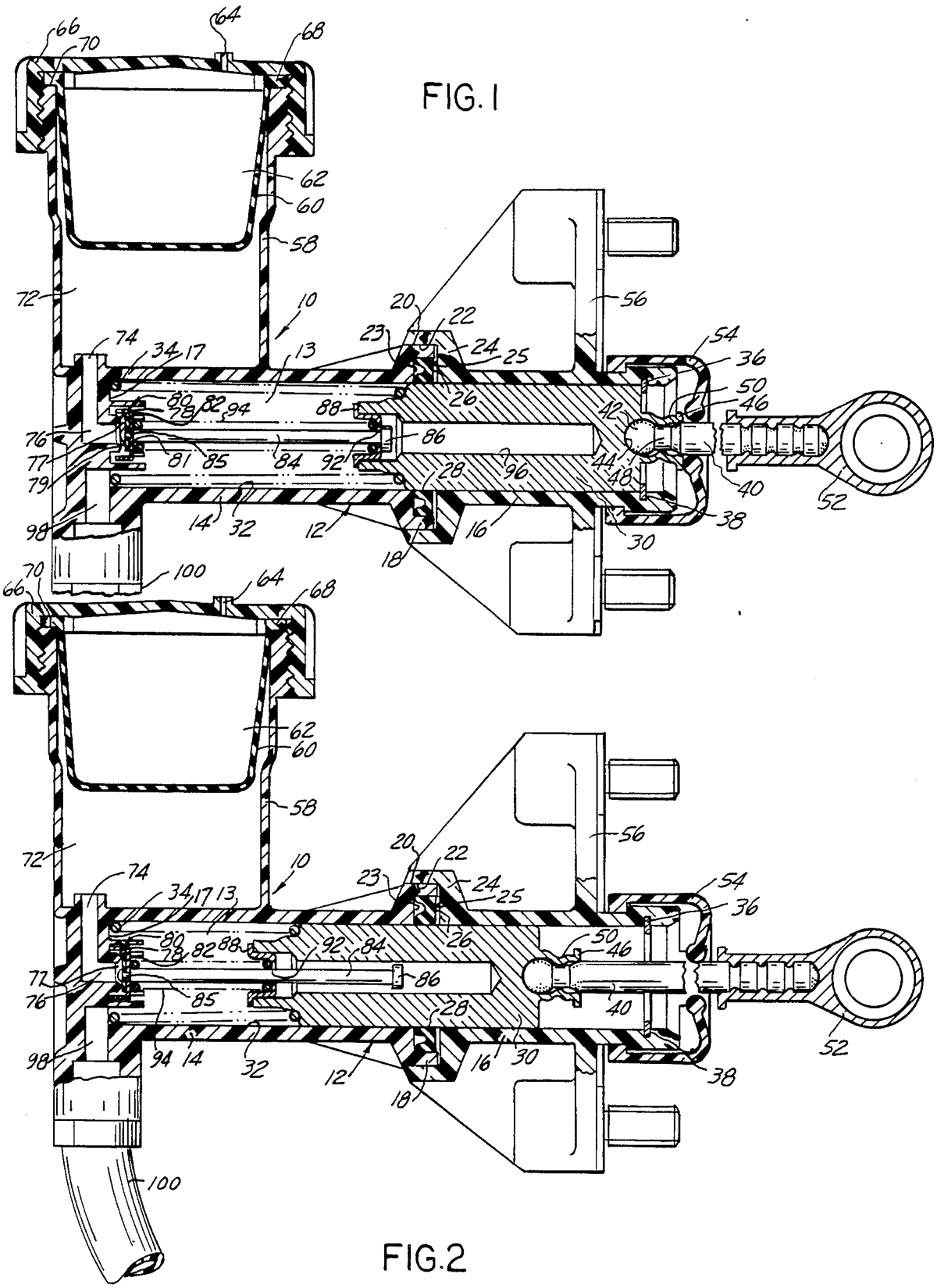

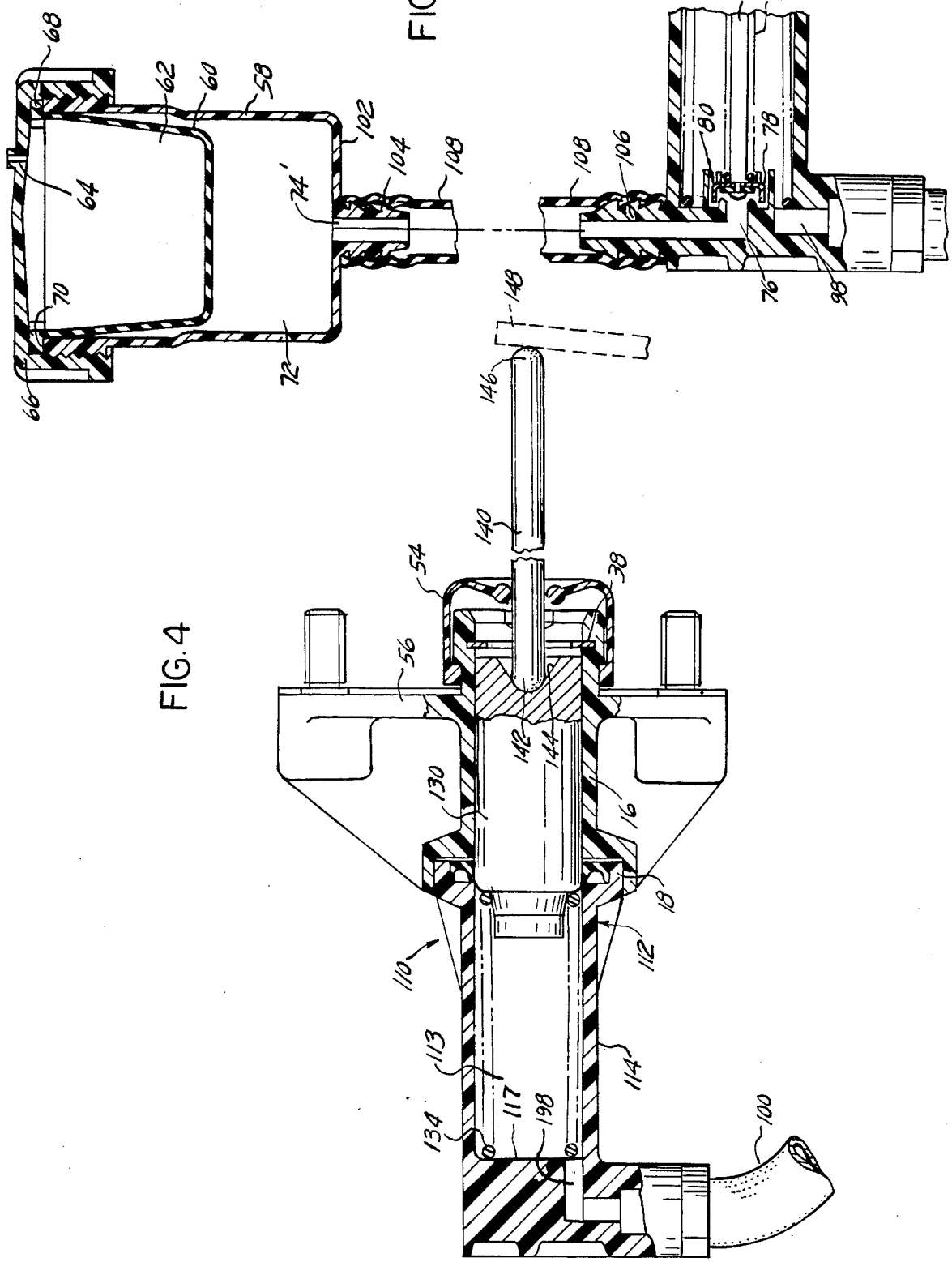

HYDRAULIC CYLINDER PROVIDED WITH A SEAL-LESS PISTON

This is a continuation of co-pending application Ser. No. 112,047 filed on Oct. 21, 1987 now abandoned, which is a continuation of co-pending application Ser. No. 830,272 filed on Feb. 18, 1986 now abandoned.

BACKGROUND OF THE INVENTION

The present invention relates to a hydraulic cylinder structure in general and more particularly to a structure having a seal-less piston.

Hydraulic cylinders, such as master cylinders and slave cylinders of hydraulic control systems for operating the clutch, the transmission or the brakes of a motor vehicle, for example, are conventionally made of a housing cast of metal or of a plastic material provided with a cylindrical bore in which is disposed a reciprocable piston. The piston is conventionally provided with at least one groove in which is placed an annular seal of elastomeric material which prevents leakage of hydraulic fluid from the high pressure side of the piston to the low pressure side. When the structure of the hydraulic cylinder is that of a master cylinder, an input member in the form of a rod is attached to the free end of the piston for reciprocal displacement of the piston within the cylinder and for causing flow of hydraulic fluid from and into the pressure side of the cylinder on the other end of the piston. In structures adapted to operate as a slave cylinder, hydraulic fluid is introduced via an appropriate conduit from the outlet of the master cylinder to an inlet into the slave cylinder on one end of the piston and an output member is attached to the other end of the piston for operating a component such as the gear shift rail of a transmission, the throw-out bearing of a mechanical clutch, or the wheel brake mechanism of a motor vehicle, for example.

In structures wherein the cylinder housing is made of plastic, a metallic tubular liner is affixed in some manner within the bore of the housing to limit wear of the bore wall caused by the reciprocating piston and piston seal.

SUMMARY OF THE INVENTION

The principal object of the invention is to provide a hydraulic cylinder for operation as a hydraulic master cylinder as well as a slave cylinder, which may be made of a simple plastic molding, in two pieces preferably for facilitating assembly of the components, provided with a reciprocable piston of simple structure having no groove or other means for installing a seal preventing leakage of fluid past the piston, and having a static seal disposed in an internal groove in the cylinder wall.

It is a further object of the invention to provide a hydraulic cylinder made of non-metallic material that requires no metallic sleeve to be installed in the bore of the cylinder housing.

Other objects and advantages of the present invention will become apparent to those skilled in the art when the following description of the best mode contemplated at the present for practicing the invention is read in conjunction with the accompanying drawings, given for illustrative purpose only, and wherein:

BRIEF DESCRIPTION OF THE DRAWING

FIG. 1 is a schematic longitudinal section of a hydraulic cylinder of the master cylinder type according to the present invention;

FIG. 2 is a view similar to FIG. 1 but showing the hydraulic cylinder in operation;

FIG. 3 is a partial view of a modification thereof;

FIG. 4 is a schematic longitudinal section through a hydraulic cylinder of the slave type according to the present invention;

DETAILED DESCRIPTION OF THE PREFERRED EMBODIMENTS

Figure 5:
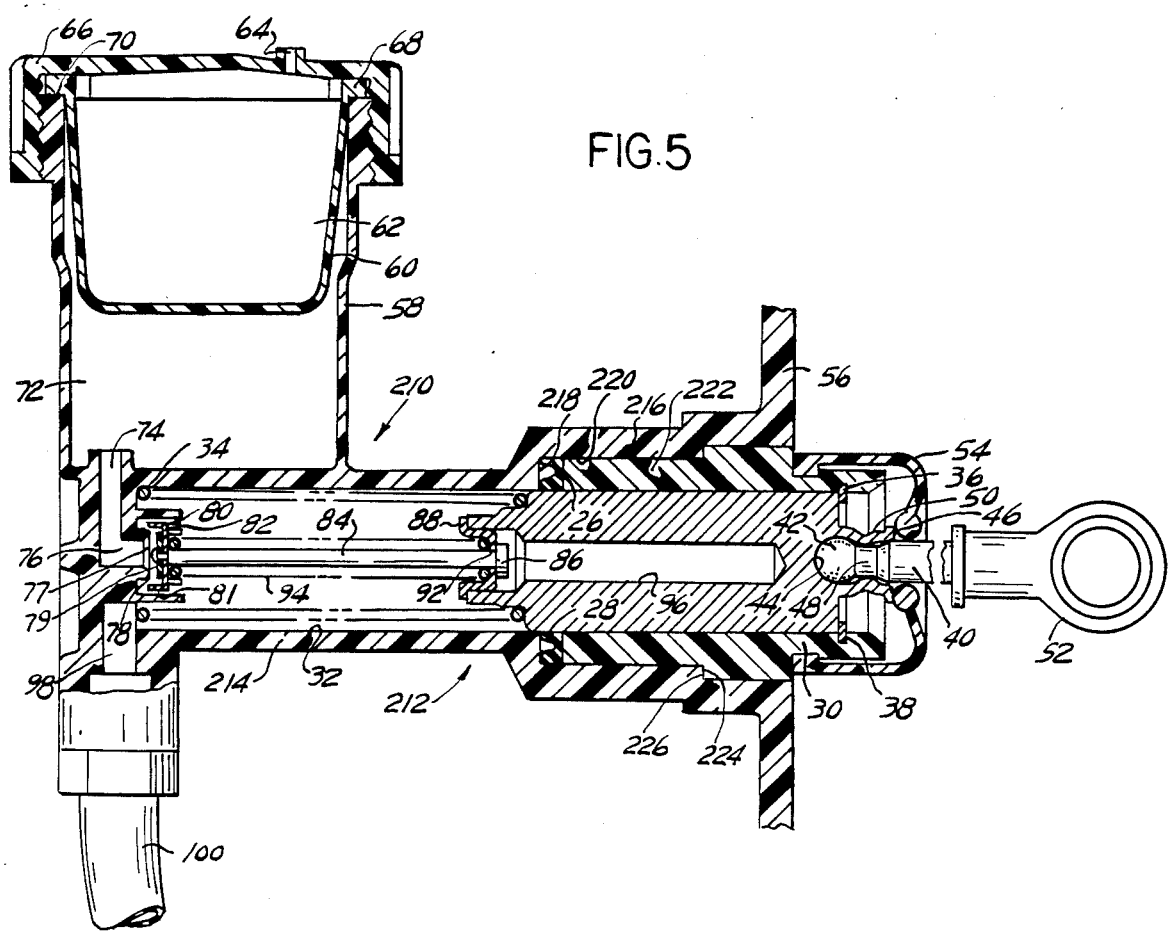
FIG. 5 is a view similar to FIG. 1, but showing the modified structure for a master cylinder.

Referring to the drawings, and to FIG. 1 more particularly, a hydraulic cylinder 10, of the master cylinder type and according to the invention, comprises a housing 12 made preferably of two separate tubular plastic moldings, forming respectively, a pressure chamber front cylinder portion 14 surrounding the cylinder pressure chamber 13, and a rear cylinder, or piston guiding, portion 16. The pressure chamber cylinder portion 14 has a closed end 17 and an open end provided with a flange 18 having a peripheral cylindrical surface 20. The flange peripheral cylindrical surface 20 is fitted within an annular collar 22 formed internally in a corresponding flange 24 at an end of the cylinder rear portion 16. The peripheral flange cylindrical surface 20 and the internal surface of the annular collar 22 are attached to each other by an appropriate bonding agent, or by ultrasonic welding. Alternatively, a bayonet mount or a screw-thread joint may be provided for attaching the rear cylinder portion 16 to the pressure chamber cylinder portion 14.

The end flange 18 of the pressure chamber cylinder portion 14 has an annular end face 23 and the end flange 24 has an annular end face 25, spaced apart from the annular end face 23, defining the sidewalls of an annular recesss or groove 26 in which is installed a static annular seal member 28 made of elastomeric material, the portion of the internal surface of the collar 22 between the annular end faces 23 and 25 defining the bottom of the groove 26. A piston 30 is slidably disposed in the bore 32 of the cylinder housing 12, and is normally urged by a coil spring 34, installed between the closed end 17 of the bore 32 in the pressure chamber 13 and the corresponding end of the piston 30, against a split spring ring retainer 36 installed in an internal groove 38 proximate the open end of the cylinder rear portion 16. Although it could also be made of plastic, the piston 30 is preferably metallic.

An input rod 40 has a partially spherical end 42 disposed in a hemispherical cavity 44 formed in the end face of the piston 30, appropriate means being provided for maintaining the partially spherical end 42 of the rod 40 in the hemispherical cavity 44 such as, for example, a cylindrical collar 46, formed integrally at the end of the piston 30, surrounding a reduced diameter portion 48 of the rod 40 and crimped as shown at 50, so as to at least partly engage into the reduced diameter portion 48 of the rod 40. The end of the rod 40 is provided with a crimped on, or otherwise fastened, clevis head 52 for attachment to an input member such as a lever or pedal, not shown. Introduction of dirt into the cylinder bore 32 from the open end of the rear cylinder portion 16 is prevented by an appropriate elastomeric boot 54. The cylinder housing 16 also has an integral mounting flange 56 for installing the cylinder 10 at an appropriate location, with the input rod 40 projecting through an opening in a bulkhead or the floorboard, not shown, of a motor vehicle, for example.

A reservoir 58 of hydraulic fluid is molded integrally with the cylinder portion 14. The reservoir 58 is separated into two chambers by a cup-shaped flexible diaphragm 60. The chamber within the cup-shaped flexible diaphragm 60 defines an air chamber 62 vented to the atmosphere through a vent port 64 in a cover cap 66 screwed or otherwise fastened, over the open end of the reservoir 58, the cup-shaped diaphragm 60 having an integral annular flange 68 squeezed between the lower surface of the cap 66 and the edge 70 of the reservoir open end. A hydraulic fluid chamber 72 is formed below the cup-shaped diaphragm 60. The hydraulic fluid chamber 72 is placed in fluid communication with the cylinder pressure chamber 13 via a passageway 74, transverse to the axis of the cylinder bore 32, and a longitudinal passageway 76. The longitudinal passageway 76 terminates in the cylinder pressure chamber 13 as a port 77 presenting an annular valve seat 78 engageable by the face 79 of a valve head 80 in the form of an elastomeric disk 81 attached to a face of a metallic flanged washer 82 mounted on the end of a rod or plunger 84, the valve head 80 being attached on the end of the rod or plunger 84 by way of a screw or rivet 85. The other end of the rod or plunger 84 has an enlarged head 86 which is disposed behind a cup-shaped clip 88 press-fitted in a cylindrical cavity 90 formed at the free end of the piston 30. The clip 88 has a central aperture 92 for passage therethrough of the rod 84, and a coil spring 94, which is disposed surrounding the rod 84 and held slightly in compression between the clip 88 and the metallic washer 82 backing the valve disk 81, tends to urge the face 79 of the valve disk 81 in engagement with the valve seat 78.

Prior to operation of the hydraulic apparatus of which the master cylinder 10 is a component, the reservoir hydraulic fluid chamber 72, the passageways 74 and 76, and the cylinder pressure chamber 13, and other components of the apparatus, are appropriately filled with hydraulic fluid and purged of air. In the position indicated at FIG. 1, in view of the length of the plunger or rod 84, the face 79 of the valve head 80 is held away from the port valve seat 78 by the rod 84, due to the enlarged head 86 of the plunger or rod 84 abutting against the rear surface of the clip 88. The cylinder pressure chamber 13 is thus in fluid communication with the hydraulic fluid chamber 72 in the reservoir 58, hydraulic fluid filling the cylinder pressure chamber 13 and being drawn from or returned to the reservoir hydraulic fluid chamber 72 at the end of the return stroke of the piston 30 to keep the apparatus constantly filled with hydraulic fluid and compensate for losses in fluid and contraction and expansion of the fluid due to temperature changes. As soon as the piston 30 is displaced forwardly by the piston input rod 40, the valve head face 79 is caused to engage the valve seat 78, and to remain engaged therewith under the action of the coil spring 94. The piston 30 has a longitudinal bore 96 enabling the rod enlarged head 86 and a portion of the plunger or rod 84 to retract within the piston 30 in the course of the stroke of the piston 30, FIG. 2, with the result that the hydraulic fluid in the cylinder pressure chamber 13 between the piston end and the cylinder end 17 is caused to flow through an outlet passageway 98 placed in communication with an operative component, such as a slave cylinder, by an appropriate conduit 100. In the course of a pressure stroke of the piston 30, the annular seal 28 in the cylinder internal groove 26 effectively prevents flow of hydraulic fluid around the periphery of the piston 30 from the pressure chamber 13 to the ambient.

Instead of forming an integral part of the cylinder portion 14, the fluid reservoir 58 may be remotely installed, as shown at FIG. 3. In such a structure, the reservoir 58 of hydraulic fluid is provided with an integral bottom wall 102 through which is formed a passageway 74' leads into a fitting 104 connected to the passageway 76 of the master cylinder via an appropriate fitting 106 and a flexible conduit 108.

FIG. 4 illustrates an example of slave cylinder 110 having a structure utilizing the same principle of sealless piston as the master cylinder 10 of FIG. 1. The slave cylinder 110, FIG. 4, has a housing 112 made of two plastic moldings forming a pressure chamber cylinder 114 and a cylinder rear portion 16, the latter being identical to the cylinder rear portion 16 of the master cylinder 10. The slave cylinder 110, FIG. 4, is provided with a modified cylindrical metallic piston 130 which, for the sake of simplifying production, may generally be shaped as the piston 30 of the master cylinder 10 but, preferably, without any longitudinal bore.

The piston 130 engages at one end a pushrod 140 having a generally hemispherical end 142 engaged in a corresponding hemispherical cavity 144 formed in the end of the piston, the other end of the pushrod 140 having, for example, a hemispherical portion 146 in engagement with, for example, a clutch release mechanism 148 such as the fork lever engaged with a clutch release bearing carrier, as is well known in the art. The piston 130 is shown at FIG. 4 in the position generally occupied by the piston of the slave cylinder 110 which corresponds to full release of a motor vehicle clutch, for example, as a result of hydraulic fluid having been transferred from the pressure chamber 13 of the master cylinder 10, FIGS. 1-2 by the displacement of the master cylinder piston 30 causing hydraulic fluid to be transferred from the pressure chamber 13 of the master cylinder 10 to the pressure chamber 113 of the slave cylinder 110, via the conduit 100 and the passageway or port 198. A coil spring 134 disposed in the pressure chamber 113 between the piston 130 and the cylinder end wall 117 constantly biases the piston 130 and the pushrod 140 towards the clutch release mechanism 148.

Figure 6:
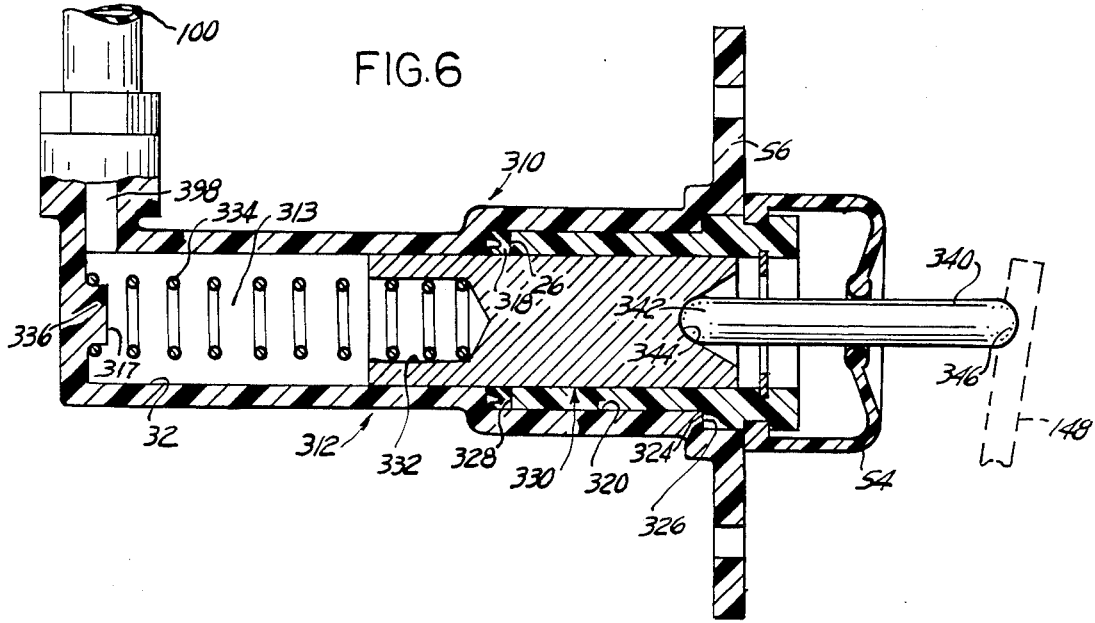
FIG. 6 illustrates a slave cylinder version of a modification of the invention shown at FIG. 5.

Referring now to FIGS. 5 and 6 which represent modifications of the invention, still utilizing the same principle of a seal-less piston structure for a hydraulic cylinder, there is more specifically illustrarted at FIG. 5 a master cylinder structure 210 and at FIG. 6 a slave cylinder structure 310. The housing 212, FIG. 5, of the master cylinder 210 comprises a generally tubular plastic molding 214 having an enlarged diameter portion 216 such as to define an annular shoulder 218 between the bore 32 of the housing 212 and an enlarged bore 220 formed within the enlarged diameter portion 216 of the tubular member 214. A plastic sleeve 222 is installed within the enlarged bore 220. An annular abutment 224 formed in the surface of the bore 220 engages with a corresponding annular abutment 226 on the periphery of the sleeve 222, and acts as a spacing means limiting the introduction of the sleeve 222 within the enlarged diameter portion 216. The annular groove 26 in which is installed the static annular seal member 28, is thus formed between the annular shoulder 218 of the tubular member 214 and the end face 228 of the sleeve 222. The peripheral surface of the sleeve 222 in engagement with the surface of the enlarged diameter bore 220 is appropriately bonded thereto by means of an appropriate bonding agent, or by ultra-sonic welding.

A similar arrangement is used for forming the annular recess or groove 26 in which is disposed the annular seal 28 in the structure of the slave cylinder 310 of FIG. 6. The slave cylinder 310 has a housing 312 provided with an enlarged diameter portion 316 in which is fitted a sleeve 322, a pair of abutment shoulders 324 and 326, one disposed in the bore 320 of the housing enlarged diameter portion 316 and the other on the peripheral surface of the sleeve 322, limiting the engagement of the sleeve 322 within the bore 320. The groove 26 is thus formed between the shoulder annular surface 318, at the junction between the bore 32 of the housing 312 and the bore 320 of the enlarged portion 316, and the annular end face 328 of the sleeve 322. The annular elastomeric seal member 28 is disposed in the groove 26 in engagement with the peripheral surface of the reciprocable piston 330. The piston 330 has one end, beyond which is disposed the pressure chamber 313, provided with a cavity or blind bore 332 in which is disposed the end of a weak biasing spring 334 having its other end disposed around a boss 336 formed on the end wall 317 of the cylinder housing 312. The other end of the piston 330 has a recess 344 of generally concave hemispherical shape in which is engaged the hemispherical end 342 of the pushrod 340, the other end 346 of which is also preferably hemispherically shaped in engagement with, for example, the clutch release member 148. The biasing spring constantly urges the piston 330 and the pushrod 340 towards the clutch release mechanism 148. The position of the piston 330, as illustrated at FIG. 6, corresponds substantially to the position occupied by the piston in the clutch full release position with the slave cylinder pressure chamber 312 filled with hydraulic fluid transferred through the passageway or port 398, via the conduit 100, from the pressure chamber 13 of a master cylinder such, for example, as the master cylinder 10 of FIGS. 1-2 or 210 of FIG. 5.

It is to be noted that in the fully engaged position of the clutch mechanism, a spring force is exerted on the end 146, FIG. 4, or 346, FIG. 6, of the slave cylinder 110 or 310, which maintains the rod 140 or 340 with its respective ends 142 or 342 fully engaged in the piston end cavity 144 or 344, the majority of the hydraulic fluid in the pressure chamber 113 or 313 having been returned to the master cylinder 10 or 210 via the conduit 100, as a result of the master cylinder piston 30 having been returned to its home position, as illustrated at FIG. 1 and FIG. 5.

Having thus described the present invention by way of examples of structural arrangements therefor, modifications of which will be apparent to those skilled in the art, what is claimed as new is as follows:

What is claimed is:

1. A hydraulic cylinder comprising:
   (A) a rear elongated housing member formed as a molded plastic member and defining an elongated smooth cylindrical rear bore of a predetermined diameter and open at its front end;
   (B) a front elongated housing member formed as a molded plastic member and closed at its front end by a front end wall and defining an elongated smooth front cylindrical bore of said predetermined diameter and open at its rear end;
   (C) a piston having an elongated cylindrical main body portion defining a smooth uninterrupted cylindrical surface devoid of seal grooves and having substantially said predetermined diameter;
   (D) coacting means operative to couple the rear end of said front housing member to the front end of said rear housing member with said bores coaxially aligned, the front of said rear bore juxtaposed to the rear of said front bore to define a smooth, continuous piston bore of said predetermined diameter slidably receiving said piston, and an annular groove defined between the rear end of said front bore and the front end of said rear bore and opening into said piston bore;
   (E) an annular seal positioned in said groove with its inner periphery in sliding and sealing engagement with said smooth cylindrical surface of said piston main body portion;
   (F) means defining an extreme rearwardly retracted position of said piston within said piston bore in which the front end of said piston cylindrical surface extends forwardly at least as far as said groove so that said seal maintains constant sealing engagement with said piston cylindrical surface irrespective of the reciprocal position of said piston in said piston bore;
   (G) a pressure chamber in said piston bore forwardly of the front end of said piston;
   (H) a rod extending through the rear end of said housing member for attachment to the rear end of said piston;
   (I) a reservoir of fluid;
   (J) a reservoir port in said front end wall of said front housing member opening in said pressure chamber;
   (K) a fluid passageway interconnecting said reservoir and said reservoir port;
   (L) a valving rod;
   (M) means connecting said valving rod to the front end of said piston with said rod extending forwardly from said piston centrally within said pressure chamber;
   (N) a valve head on the front end of said valving rod for valving coaction with said reservoir port; and
   (O) a discharge port in said front housing proximate said front end of said front housing and opening in said pressure chamber independently of, and at a location spaced from, said reservoir port.

2. A hydraulic cylinder according to claim 1 wherein:
   (J) said coacting means on said front housing member comprises an annular flange at the rear end of said front housing member defining an annular radially outwardly extending surface at the rear endd of said front bore defining the front border of said groove and an annular axially extending surface extending axially rearwardly from the radially outer edge of said radially extending surface defining the radially outer boundary of said groove; and
   (P) said coacting means on said rear housing member comprises means defining an annular radially outwardly extending surface at the front end of said rear bore defining the rear boundary of said groove.

3. The hydraulic cylinder of claim 1 wherein said front housing member has an enlarged bore end portion and said rear housing member comprises a sleeve fixedly engaged in said enlarged bore end portion, said groove in which said seal is disposed being formed between the front end face of said sleeve and a shoulder on said front housing member at the juncture between said rear bore and said enlarged bore.

4. The hydraulic cylinder of claim 1 wherein a longitudinal bore is provided in said piston in alignment with said valving rod for allowing said valving rod to retract in said longitudinal bore, a valve seat is formed around said reservoir port, biasing means are provided to urge said valve head toward engagement with said valve seat, and means are provided at the rear end of said valving rod for limiting the amount of extension of said valving rod such as to hold said valve head away from said valve seat when said piston is in one extreme position, whereby said valve head engages said valve seat when said piston is displaced away from said extreme position.

5. The hydraulic cylinder of claim 1 wherein a longitudinal bore is provided in said piston in alignment with said valving rod, said connecting means allows said rod to retract in said longitudinal bore, a valve seat is formed around said reservoir port for coaction with said valve head, biasing means are provided for urging said valve head toward engagement with said valve seat, said connecting means functions to move said valve head away from said valve seat when said piston is in one extreme position and functions to allow said valve head to engage said valve seat when said piston is displaced away from said extreme position, and said cylinder further includes a coil spring arranged to bias said piston toward its rearwardly retracted position and seated at its front end against the front end of said front housing in concentric surrounding relation to said valve seat and in forwardly spaced relation to said valve seat.

6. The hydraulic cylinder of claim 5 wherein said biasing means comprises a further coil spring surrounding said valving rod and extending between said valve head and said piston.

* * * * *